United States Patent [19]

Pipon et al.

[11] Patent Number: 4,925,228
[45] Date of Patent: May 15, 1990

[54] SIMPLE MEMORY MECHANISM COMPRISING A MECHANICAL JACK FOR TILTING OVER CONTROL ON THE FRONT OF A VEHICLE SEAT

[75] Inventors: Yves Pipon; Georges Droulon, both of Flers, France

[73] Assignee: A. & M. Cousin-Etablissements Cousin Freres, Orne, France

[21] Appl. No.: 228,729

[22] Filed: Aug. 4, 1988

[30] Foreign Application Priority Data

Aug. 6, 1987 [FR] France .................. 87 11194

[51] Int. Cl.$^5$ .............................................. B60N 1/02
[52] U.S. Cl. .................................. 296/65.1; 297/329; 297/330; 297/379; 248/398; 248/395
[58] Field of Search ............... 296/65.1; 297/329, 330, 297/379, 378, 317; 248/398, 395

[56] References Cited

U.S. PATENT DOCUMENTS 2,929,439  3/1960  Tanaka et al. .................. 297/330 X
4,568,053  2/1986  Strowik et al. ................. 297/330 X
4,700,989 10/1987  Ercilla ........................... 296/65.1 X
4,736,985  4/1988  Fourrey et al. ................. 297/379 X
4,805,953  2/1989  Yamauchi ...................... 296/65.1 X

FOREIGN PATENT DOCUMENTS

1037093  8/1958  Fed. Rep. of Germany ...... 297/329
 823912  1/1938  France ........................... 297/329

Primary Examiner—Margaret A. Focarino
Assistant Examiner—Joseph D. Pape
Attorney, Agent, or Firm—Robert W. Becker & Associates

[57] ABSTRACT

Each front seat has under the base plate in its median longitudinal axis a rack connector rod and a mechanical bolt, this rack connector rod cooperating with a box joined to the floor of the vehicle via a framing and a brace, this box containing a blockable motor device. The entire afore-mentioned unit cooperates with two parallel arms first of all joined to the rear part of the seat and secondly joined to the floor of the vehicle via a spindle containing a memory constituted by a ring with a notch and the nose of the lever.

9 Claims, 7 Drawing Sheets

Fig. 14

SIMPLE MEMORY MECHANISM COMPRISING A MECHANICAL JACK FOR TILTING OVER CONTROL ON THE FRONT OF A VEHICLE SEAT

BACKGROUND OF THE INVENTION

The present invention relates to a simple memory mechanism that includes a mechanical jack for the tilting control on the front of a vehicle seat, especially for two-door vehicles that have rear seats.

In current motor vehicles, the lateral slide rail equipments of a seat base plate require and have a need for a complex unit which is consequently expensive. In fact, the actual cost is double as to all vehicles which comprise two individual seats at the front thereof.

The situation is even more expensive for vehicles with two doors, requiring the use of mechanisms which are complicated, delicate and therefore expensive for each seat in order to make them tilt towards the vehicle front as well as over the steering wheel to allow passengers sitting on the vehicle rear seating unit to get in and out relative thereto.

This latter mechanism must also be designed to provide extra safety in the event of an accident occurring.

Currently and for low-priced range vehicles, it is therefore necessary to provide mechanisms having functions identical to those designed for deluxe car seats, but with a significantly less expensive cost or lower price, involved therewith.

This has led to suppressing any movement giving rise to the need for additional mechanism parts which accordingly increase prices.

Lower cost research reveals that there is a need to provide a tilting seat allowing for easy access to the rear seats of a two door vehicle and therefore also to provide a "three-point" unit designed so as to have two linking points at the rear of the seat and a third point at the front of the seat and inside its longitudinal axis. Such a three-point solution provides increased safety by ensuring the seat is firmly maintained on the floor of the vehicle.

During tilting of the seat towards the front, in order to avoid part of the positioning mechanism projecting to the rear of the seat, a small memory mechanism has been developed, this mechanism needing to remain under the seat base plate when the seat is tilted towards the front.

Thus, the aim of this invention is to provide a simple memory mechanism incorporating a mechanical jack for the tilting control towards the front of a vehicle seat which comprises a small box holding a shaft integral with a reversible pitch screw, this small box being secured by means of a framing or directly onto the floor of the car body in the lower central zone of the seat while a rack connector bar is integral with the bottom of the seat without the extreme limits of seat positions being exceeded.

Via the use of a reversible pitch screw, it is very easily possible to produce a unit for returning into the first selected position, either manually or by means of a small motor.

From the above-mentioned facts, three principles merge:

(a) return to the position selected via a mechanical unit, (b) return to the position selected via the use of electromechanical means, (c) return to the position selected via the control of an electronic circuit.

The two linking points at the rear of the seat are realized by the tilting arms of each holding device and comprise a positioning memory.

SUMMARY OF THE INVENTION

In accordance with the invention, each front seat, under the base plate beneath its longitudinal axis is a rack connector bar and a mechanical bolt. This rack connector bar cooperates with a box joined to the floor of the vehicle by means of a frame and a brace. This box contains a blockage motor device. The entire aforementioned front unit cooperates with two parallel arms firstly joined to the rear part of the seat and secondly joined to the floor of the vehicle by means of a spindle containing a memory consisting of a one-tooth ratchet cooperating with a lever provided with a nose, the unit formed by the bolt, the mechanical memory and the memory comprising the ratchet, the notch and the lever nose being controlled by a single device connected to the various memories via Bowden cables.

According to another feature of the invention, inside the box there is a reversible endless screw rolling in the rack connector bar, this endless screw being mounted on a spindle resting in the bearings of the box and normally being blocked by a shoe subjected to the action of a lever kept in the endless screw blocking position by means of a spring.

Various other features of the invention appear from reading the following detailed description.

BRIEF DESCRIPTION OF THE DRAWINGS

By way of examples in no way restrictive, the means for embodying the subject of the invention are shown in the annexed drawings.

DESCRIPTION OF PREFERRED EMBODIMENTS

Figures 1, 5, 6, 7:
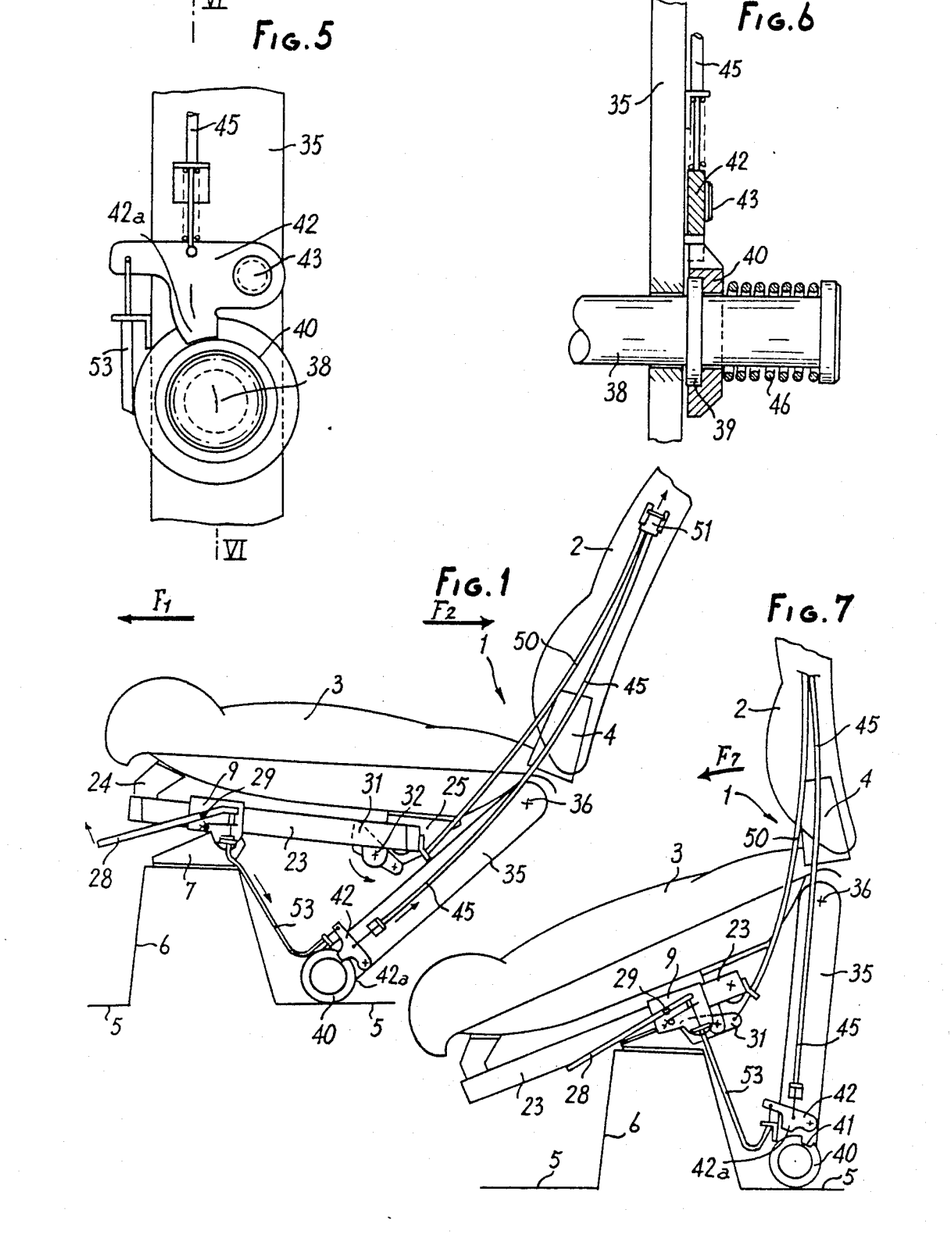
FIG. 1 is a diagrammatic side view of the seat fitted with a simple memory mechanism comprising a mechanical jack for the tilting control towards the rear of a two door vehicle seat.
FIG. 5 is a large-scale side view of the lower part of one of the arms supporting the rear of the seat.
FIG. 6 is a sectional view taken along the line VI—VI of FIG. 5.
FIG. 7 is a diagrammatic side view of the seat tilted to the front towards the steering wheel so as to enable passengers to move to the rear of the vehicle.

FIG. 1 is a view that diagrammatically shows a seat 1 intended to be mounted at the front of a two door vehicle, either at the driver's seat or at the passenger's seat, as the two front seats need to tilt completely towards the front to provide access to the right or the left of the vehicle, thus enabling the rear seat passengers to sit on the backseat or get out of the vehicle.

The seat 1 comprises a backrest 2 and a base plate 3 of a known type not requiring any particular description.

The link between the base plate 3 and the backrest 2 is effected by means of at least one joint mechanism 4 allowing for adjustment of sloping of the backrest 2 in relation to the base plate 3, as is now well-known. These mechanisms for adjusting the slope of the backrest 2 are of known types and are denoted hereafter by the term "joint brace".

As can be seen in the view of FIG. 1, the floor 5 of the car body comprises a framing 6 projecting vertically and placed on the front and which supports a brace 7 which is placed so as to be below the longitudinal axis of the seat 1. The brace 7 carries a spindle 8 around which a box 9 may revolve (see FIGS. 2, 3 and 4); the box 9 containing inside a shaft 10 on which is mounted a reversible endless screw 11.

Figures 2, 3, 4:
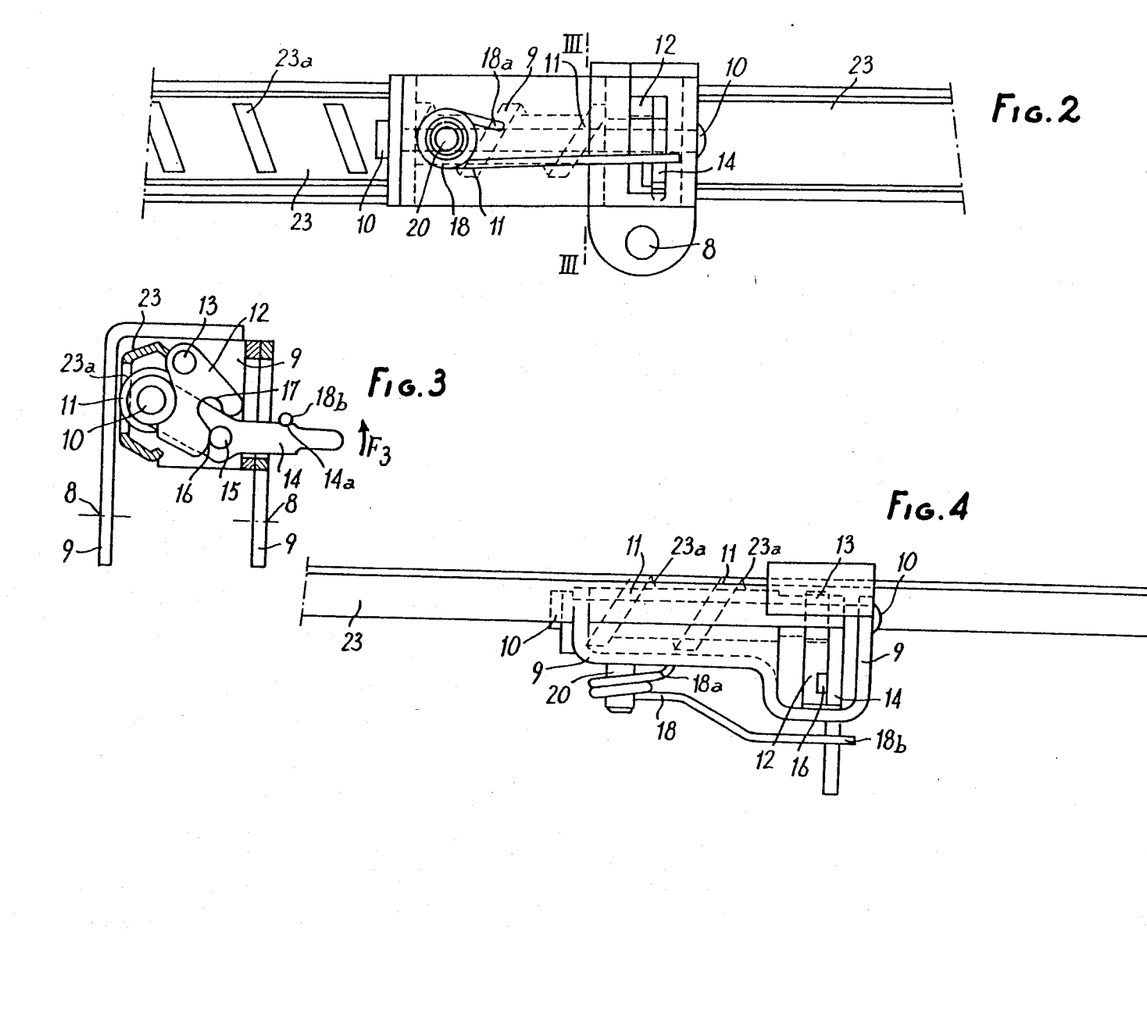
FIG. 2 is a view that shows a partial large-scale vertical section of the central rack connector rod equipped with the reversible screw with its blocking device.
FIG. 3 is a view that shows a section taken along the line III—III of FIG. 2.
FIG. 4 is a view showing a horizontal projection corresponding to that of FIG. 2.

This endless screw 11, which can be braked by means of a shoe 12, can revolve on a spindle 13 integral with the box 9. The shoe 12 is kept in place by a lever 14 joined to the shaft 10 contained in the box 9; and a spindle 15, fixed inside the central zone of the lever 14, normally leans against an extension 16 of the shoe 12 which, behind this extension 16, has a recess 17 producing the cam blocking effect.

Finally, a spring 18, secured via its extremity 18a to the box 9 held by winding onto a spindle 20 integral with the box 9, rests, via its extremity 18b, inside a notch 14a on the lever 14 thus blocking, by means of the shoe 12, the reversible endless screw 11. This screw 11 cooperates with a rack connector rod 23 able to slide inside the box 9 so that the reversible endless screw will engage with the opening 23a provided on the vertical face of the rack connector rod 23.

As the connector bar 23 is fixed by means of a bracket 24 under the front extremity of the base plate 3 and by a corner plate 25 under the rear extremity of the base plate 3, it is therefore possible, when the reversible endless screw 11 is freed from the shoe 12, to make the rack connector rod 23 slide either to the front (arrow $F_1$, FIG. 1) or to the rear (arrow $F_2$, FIG. 1). Both the bracket 24 and corner plate 25 are disposed below the longitudinal axis of the seat 1.

Freeing of the shoe 12 by means of tilting in the direction of the arrow $F_3$ (FIG. 3) of the lever 14 against the action of the spring 18 is effected usually by a lever 28 pivotally mounted on a spindle 29 integral with the box 9 (see FIG. 1).

There is also a retractable bolt 31 pivotally mounted on a spindle 32 integral with a lower extension of the corner plate 25, this retractable bolt 31 cooperating with the rack connector rod 23 to form a stop and enabling for normal use of the seat; beyond this stop, the useable travel no longer being permitted, and only being used for full tilting towards the front to enable users to move into the rear seats.

As apparent in FIG. 1, the rear zone of the base plate 3 of the seat 1 is maintained on each side by arms 35 joined at their upper part 36 to a spindle integral with the bottom of the base plate 3 and at each lower part thereof relative to a spindle 38 by means of a flange 39 carrying a ring 40 with a notch 41 designed to cooperate with a lever 42 pivoting around a spindle 43 integral with the arm 35. The lever 42 has a nose 42a normally penetrating inside the notch 41 in order to lock each arm 35 in the inclined position as shown in FIG. 5. In this way, the normal position of the seat is memorized and blocked. But, by means of a mechanical command constituted by a Bowden cable 45, it is possible to unlock the lever 42 to free the nose 42a from the notch 41 thus allowing for the easy but controlled rotation of each arm 35. Moreover this rotation is controlled by being subjected to the pressure of the spring 46 acting by pressure on the ring 40, this spring 46 being centered on the spindle 38 (see FIG. 6).

Similarly, the bolt 31 is controlled by a Bowden cable 50 connected to the single control device 51 placed at the upper part of the backrest 2 (see FIG. 1).

The tilting or pivoting movement of the lever 42, by means of the Bowden cable 53, brings about and causes the freeing of the shoe 12 by pivoting the lever 14 against the action of the spring 18, as shown in FIGS. 3 and 7.

In this way, the reversible endless screw 11 is freed at the same time as the arms 35 and, because the pivoting bolt 31 is also freed, the seat can be very easily made to tilt towards the front in the direction of the arrow $F_7$ (FIG. 7) enabling persons wishing to enter the rear of the two door vehicle or wanting to leave the vehicle by moving easily without being impeded, either by the base plate or by the backrest of the seat involved therewith.

When it is desired to bring the seat 1 from the position shown in FIG. 7 to the position of FIG. 1, need exists merely for the seat to be tilted to the rear, the arms 35 resuming their first position, the levers 42 locking the arms 35 in the seating position of the seat, the rack connector rod 23 resuming its place.

At this precise moment, the shoe 12 again blocks the reversible endless screw 11: the seat is thus completely locked and safety-proof. At the same time, the bolt resumes its place in order to limit the normal use travel.

Therefore, it is possible to fix in a known manner safety belt on this seat.

All the mobile rack connector rod parts 23, arms 35 and the cooperating joints are calculated and provided so as to keep the seat in the correct position in the event of side or front/rear impacts on the vehicle and ensure the safety of any passengers in the vehicle.

Return to the use position is quickly effected by the mere weight of the seat 1.

In FIGS. 8 to 11, the device for tilting the seat 1 comprises the same reference numeral designations, since the devices are strictly the same, apart from the box 9 that contains an electric motor which during rotation drives the reversible endless screw 11. The motor is power-fed (not shown) via connectors 60, this feeding being controlled by two micro-switches 61, 62 (see FIG. 8a) placed on the upper part of the backrest 2. Consequently, when maneuvering the lever 63 corresponding to the single control device 51 of FIG. 1 towards the bottom, that is in the direction of the arrow $F_8$ (FIG. 8a), power feeding of the motor contained in the box 9 is shut off by the micro-switch, which, as in the previous instance, causes the seat to pivot in the direction of the arrow $F_{11}$ (see FIG. 11). At the same time, the unlocking of the lever 42 brings about and causes the closing of the micro-switch 64 also controlling the feed circuit of the motor of the box 9 (FIG. 11); the positioning bolt 31 is removed without the action of the cable 50.

Figures 8, 8A, 9, 10, 11:
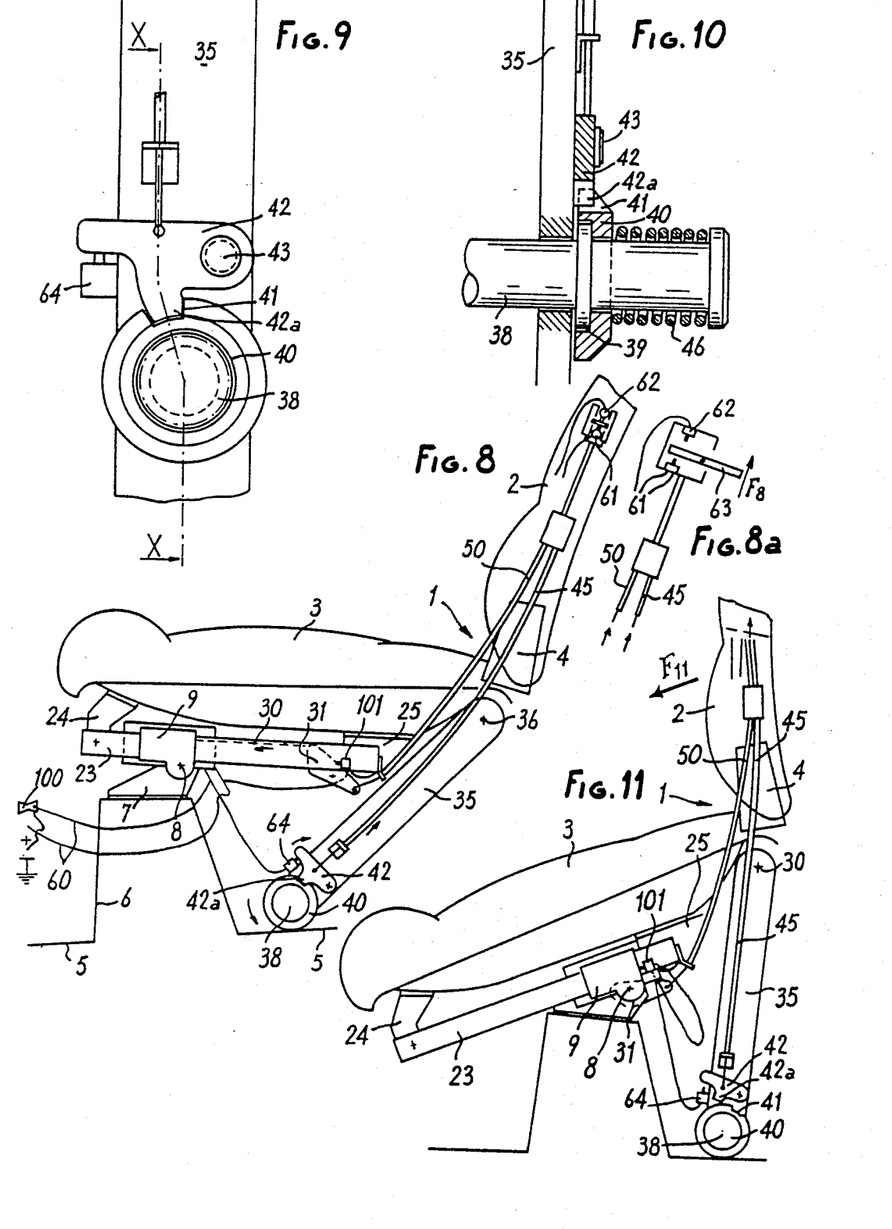
FIG. 8 is a diagrammatic side view of a second type of embodiment of the seat equipped with a simple memory mechanism, but with electromagnetic control.
FIG. 8a is a large-scale view of the upper part of FIG. 8.
FIG. 9 is a large-scale side view of the lower part of one of the arms supporting the rear of the seat and representing the memory mechanism.
FIG. 10 is a sectional view taken along the line X—X of FIG. 9.
FIG. 11 is a view that shows the seat in the position tilted to the front to enable a passenger to move to the backseat of a two door vehicle.

When an individual wants to re-establish the normal position of the seat shown in FIG. 8, the inversion of the tilting of the lever 63 via the micro-switch 62 brings about or causes power feeding for actuation of the motor contained in the box 9, but in the opposite direction, and when the seat has resumed its first position as explained in the situation shown in FIGS. 1 to 7, power feeding of the motor in the box 9 is cut off as the micro-switch 64, cooperating with the lever 42, opens the power feed circuit of this motor, namely at the moment the nose 42a of the lever 42 penetrates the notch 41 of the ring 40 (the position shown in FIG. 8). At the same time, the above-described means of the seat have resumed their original position and the seat has resumed the initially selected position. A new adjustment for another user is made by activating the button 100 which controls the motor via the wires 60.

Figures 12, 12A, 13:
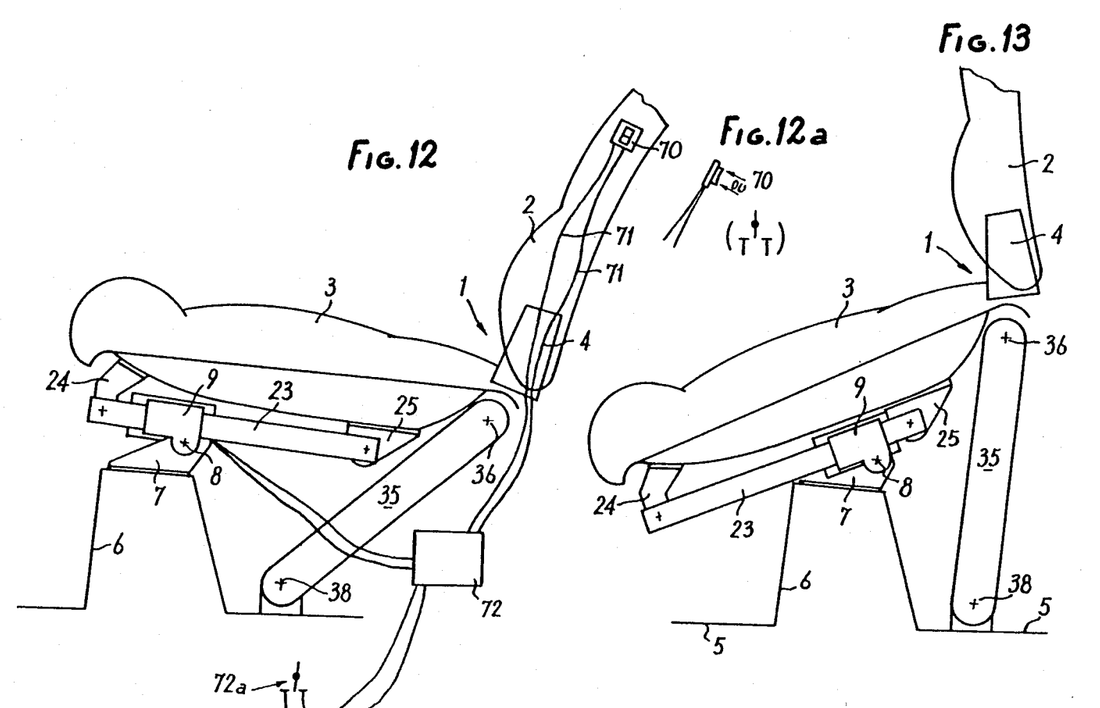
FIG. 12 is a diagrammatic side view of a seat provided with the simple memory mechanism comprising electronic control.
FIG. 12a is a large-scale view of the upper part of FIG. 12.
FIG. 13 is a diagrammatic side view of the seat of FIG. 12 tilted to the front to enable a passenger to move to the backseat of a two door vehicle.

As to the embodiment of FIGS. 12, 12a and 13, at the top of the backrest 2 (see FIGS. 12 and 12a), a reversible switch 70 is provided which allows for feeding of the motor of the box 9, as explained earlier in accordance with FIGS. 9 to 11. However, since the electric feed circuit 71 of this electric motor passes through an electronic card 72 able to include a memory, all the operations are made automatically. Thus the switch 71 merely needs to be inverted in order to obtain initially, on one hand, tilting towards the front of the seat (see FIG. 13) or, on the other hand, bringing this seat back to its normal position (see FIG. 12).

The electronic card 72, when it includes a memory, enables the effective travel of the rack connector rod 23 to be limited, and this electronic card 72 comprises a switch 72a enabling the contents of the memory to be adjusted so as to obtain longitudinal adjustment of the seat according to the wishes of its occupant.

In the situation in accordance with FIGS. 12 and 13, it is possible for the reversible switch 70 and the memory switch 72a to be placed at different locations of the car or vehicle body so as to facilitate handling of the seat in question, either by the passengers sitting at the rear of the vehicle or by the driver or passenger sitting at the front of the vehicle.

In the situation in accordance with FIG. 8, mention is made that it is also possible to replace the pivoting bolt 31 in the rack connector rod 23 by two limit of travel switches, able to be moved manually. A rear limit of travel switch 101 is shown in FIG. 8, the same switch normally being located under the front of the base plate 3 of the seat.

Figure 14:
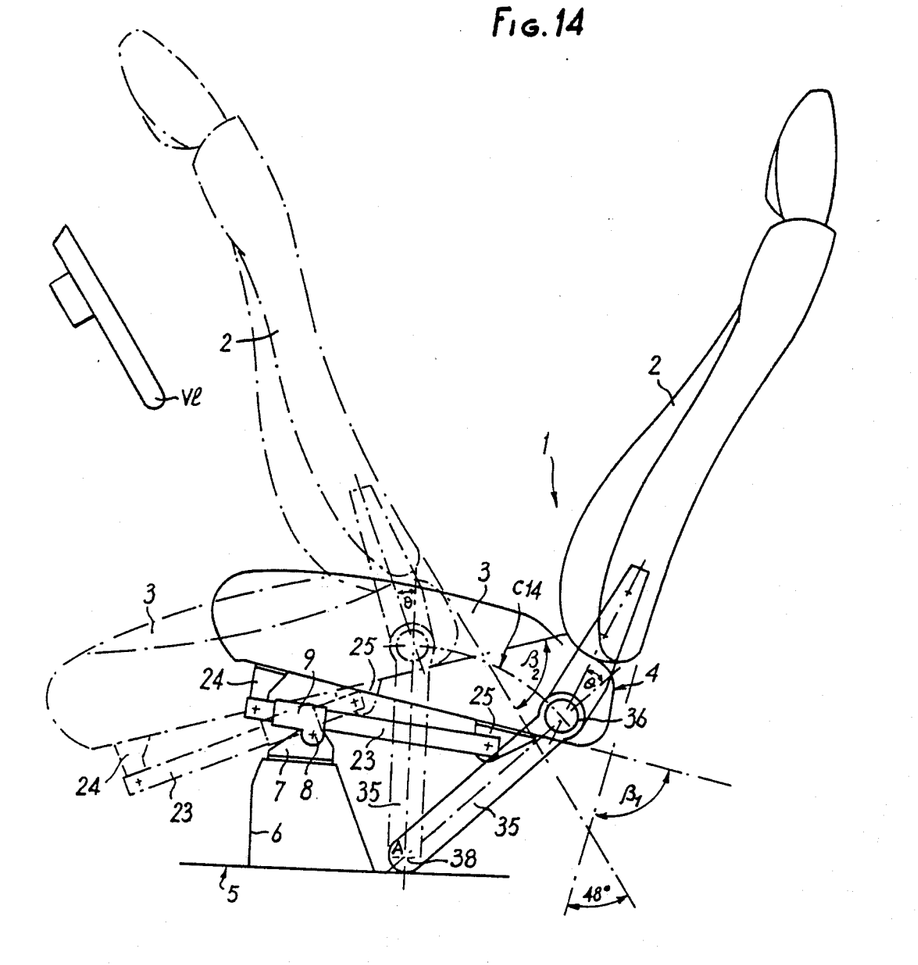
FIG. 14 is a view showing a diagrammatic vertical elevation of an embodiment variation of the simple memory mechanism, the lower part of the joint brace forming an integral part of the tilting arms.

In the situation in accordance with FIG. 14, the front part of the simple memory mechanism is identical to the preceding situations and these same elements thus are identified by the same reference numeral designations.

As to the rear arms 35, although this is not shown in FIG. 14, each of them comprises the positioning memory already described in relation with FIG. 1 and which is constituted by the ring 40, its notch 41 and the lever 42 with its nose 42a, these rear arms being secured directly at the upper part 36 thereof onto the hinge pin of the device for adjusting the inclination of the backrest $F_2$ (joint brace) in relation to the base plate 3. More particularly each arm 35 is integral with the fixed base plate brace of the backrest/base plate joint which ensures that the displacement curve C14 of the central point of the arms 35 has a higher developed circular shape; this allows for moving from one angle of roughly 29° in the situation of FIGS. 1 to 13 for the tilting of the entire seat to an angle of almost 50° in the situation in accordance with FIG. 14. This phenomenon is solely due to compensation of the angular values of the fixing points of the carriage 9 in relation to the arms 35 and the arm linkage 35 with the braces of the fixed element of the backrest/base plate joint. The adjustment for the choice of the positions for each user is obtained by activating the button 72a (see FIG. 12).

Figures 15, 16, 17:
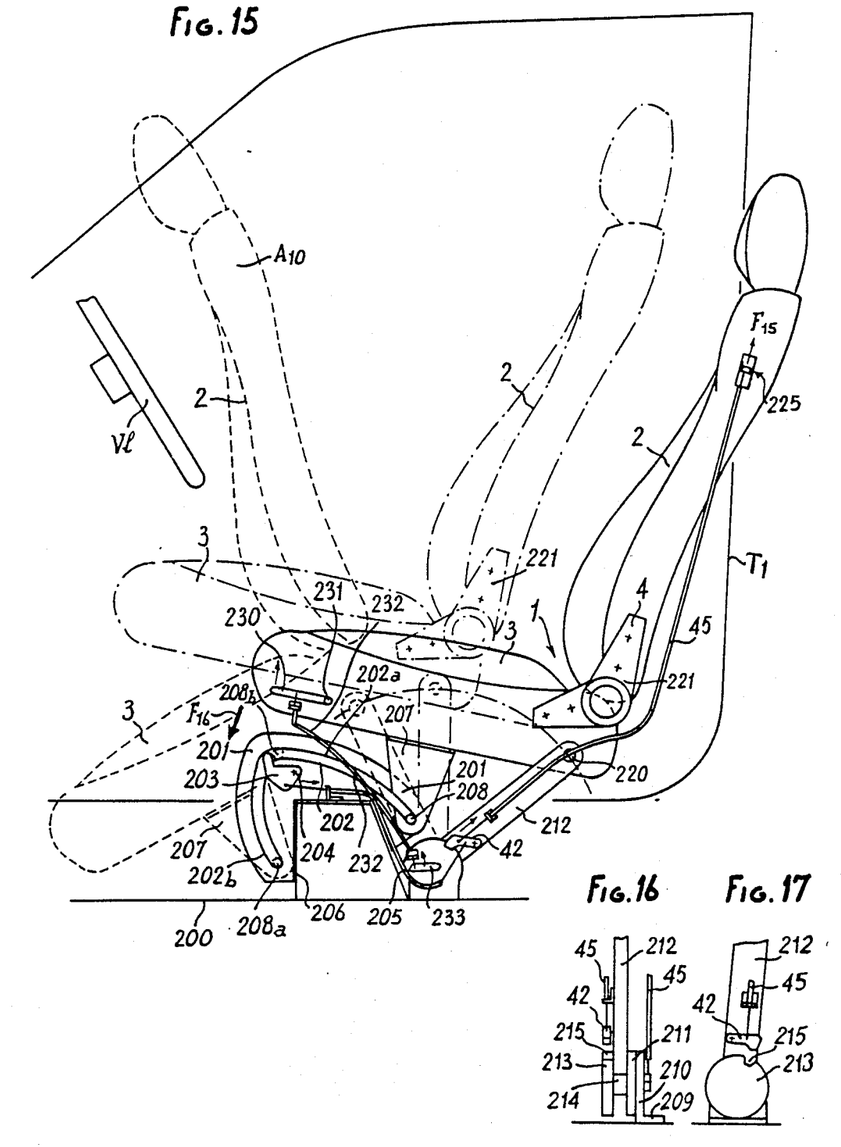
FIG. 15 is a view showing a diagrammatic vertical elevation of an embodiment variation of the memory mechanism fitted with a joint brace.
FIGS. 16 and 17 are partial orthogonal views of the lower side part of the seat control of FIG. 15.

In FIG. 15, the floor 200 contains in the front zone, as already indicated earlier, a framing 206 with a part 201, assuming the form of a heart-shaped flange pierced with a curved window 202 having initially an upward run 202a and, in the front part, a downward run 202b, to be fixed below the longitudinal axis of the seat (which refers to a position at the longitudinal axis of the seat or base plate, this base plate being in fact the sitting portion of the seat). A bolt 203 is pivotally mounted on a spindle 204 and is connected by a Bowden cable 205 to the lever 42. The base plate 3 of the seat 1 at its lower part bears or carries a corner plate 207, and a spindle 208 is secured to the lower part of the said corner plate 207 and is able to move inside the curved window 202. Behind the framing 206, a support 209 is mounted and bears the fixed flange 210 of a joint brace whose mobile flange 211 is integral with an arm 212 (see FIGS. 16 and 17). The mobile flange 211, the arm 212 and a memory ring 213, identical to the ring 40, are rigidly connected to each other by a spindle 214 (see FIG. 16).

The ring 213 carries a notch 215 identical to the previous notch 41. The lever 212 also carries the lever 42 with its Bowden cable control 45.

As in accordance with situations of the preceding FIGS. 1 to 13, the two rear arms 212 are mounted on a common spindle 220. The joint brace encompassing the fixed flanges 210 and 211 is rotation-controlled by a motor (not shown) and, for each seat, there could be a single joint brace or two joint braces placed on either of the two arms 212 at their lower part. The base plate 3 and backrest 2 are connected to each other by another joint brace 221 allowing for adjustment of inclination of the backrest 2 in relation to the base plate 3 of the seat 1. T1 diagrammatically shows the opening of the car body, normally closed by the door, and V1 denotes the steering wheel of the car.

As clearly shown in FIG. 15, when one wishes to have the seat positioned as shown by full lines in this figure, namely a position whereby the seat can be used by the driver or passenger, moved to the full clearing position, namely the broken lines position at $A_{10}$ (FIG. 15), this is effected as in the previous situations by maneuvering the button 225 towards the top (arrow $F_{15}$, FIG. 15). The purpose of this is first to unlock the lever 42 and secondly at the same time to lower the bolt 203 in the direction of the arrow $F_{16}$ (FIG. 15).

This maneuver also, by means of a circuit (not represented), brings about or causes power feeding of the drive motor of the joint brace(s) 221 encompassing the fixed flanges 210,211 thus rotatably driving the arms 212 towards the front and also causing the displacement of the spindle 208 into the curved window 202, initially into the part 202a and then next into the lowerable part 202b in order to bring this spindle 208 into the lower position 208a (see FIG. 15).

Consequently, the seat completely clears the space needed for the passengers to get inside the rear part of the two door vehicle in question.

By maneuvering the button 225 opposite to the direction of the arrow $F_{15}$ and under the effect of the motor driving the joint brace(s) 221 encompassing the fixed flanges 210,211, it is possible to bring the seat with its position $A_{10}$ to its normal position shown by the full lines in FIG. 15.

However, so as to allow for easy adjustment of the trim of the seat 3, it is also possible, by means of the lever 230 placed on one of the sides of the seat, for example between the two front seats, with said lever revolving around a spindle 231, via a Bowden cable 232, to control a small lever 233 which brings about or causes power feeding of the electric motor for driving the joint brace(s) 221 encompassing the fixed flanges 210,211 and thus causing the arms 212 to pivot with a certain angle with sliding of the spindle 208 into the upper part of the curved window 202 and to a position of the base plate suitable for the passenger or the driver.

The release of the lever 230 brings about or causes stopping of power feeding of the control motor of the afore-mentioned joint brace(s) and accordingly blocks these braces in the selected position.

This movement is in any event limited by the bolt 203, for at the maximum the spindle 208 may arrive during adjustment of the stable position of the base plate of the seat at the position 208b (see FIG. 15).

The spindle 208 is generally made of thick metal or thick plastics material facilitating the movement of this spindle in the curved window 202 which may comprise, especially around its inner circumference, projecting lips facilitating first the proper guiding of the spindle 208 and secondly its continuous smooth sliding.

Figure 18:
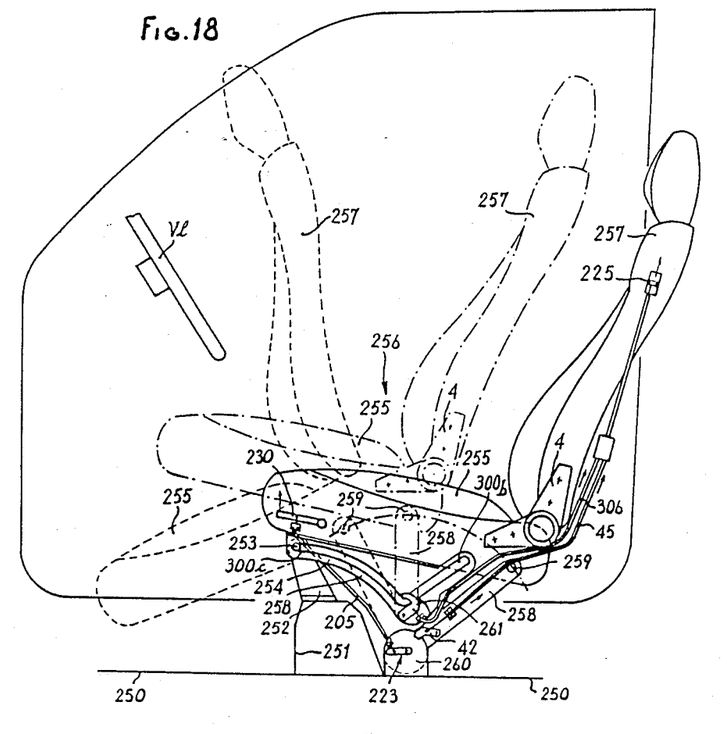
FIG. 18 is a view showing a diagrammatic vertical elevation of an embodiment variation of the memory mechanism of FIG. 15.
Figures 19, 20:
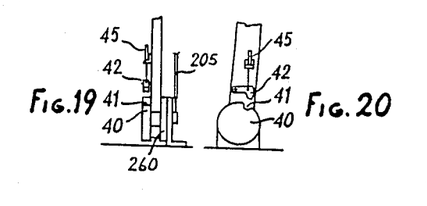
FIGS. 19 and 20 are partial orthogonal views of the lower side part of the seat of FIG. 18.

In FIG. 18, the floor 250 of the vehicle, as already indicated earlier in the front zone, carries a framing 251 containing a corner bracket 252 secured to its top. The corner bracket 252 carries a spindle 253 which penetrates or extends through a V-window 300 drilled into a flange 254 integral with the top of the base plate 255 of the seat 256 having a backrest 257 therewith. The branches 300c and 300b of the V are unequal, 300c being slightly curved and 300b being straight.

As previously mentioned, the backrest 252 is joined to the base plate 255 by a joint brace 4. The rear of the seat is maintained by two arms 258 joined at their upper part to a spindle 259 and at their lower part each being joined to a joint brace 260 which may be a notch blocking joint, that is with sliding bearing plates, or a continuous motorized micrometric joint.

The other devices permitting the clearance of the seat are identical to those of FIG. 15 and bear the same reference numeral designations.

The functioning of this seat mechanism is identical to that of FIG. 15, but the bolt 261, which is placed opposite the bottom of the V-window 300 between the two branches of the latter, allows in the front branch 300c for the longitudinal adjustment of the seat 256 and, when the effectiveness of bolt 261 is cancelled by the control 225, the spindle 253 may move inside the branch 300b of the V-window 300 so as to make the seat pivot fully toward the front against the steering wheel V1 and thus to clear a space sufficient to enable the passenger(s) to enter or leave as to the rear seat location in the vehicle.

Moreover, the joint braces 233 (see FIG. 15) may also be joints with blocking by notches, or sliding bearing plates, or still motorized continuous means.

The present invention is, of course, in no way restricted to the specific disclosure of the specification and drawings, but also encompasses any modifications within the scope of the appended claims.

What we claim is:

1. A simple memory mechanism including a mechanical jack for the tilting control on the front of a seat of a vehicle comprising:

for said seat, a base plate, with a longitudinal axis and including, below said base plate, a rack connector rod and a mechanical bolt, said connector rod cooperating with a box that is coupled to the floor of said vehicle via framing and brace means, with said box containing a blockable motor device collectively to form a unit cooperating with two parallel arms, each of which is joined both to a rear part of said seat, and to said floor of said vehicle via a spindle that contains a memory in the form of a ring with a notch that cooperates with a nose of a first lever that is pivotably mounted on said arm and is controlled by a single control device that is connected to said first lever and said mechanical bolt by Bowden cable means.

2. A memory mechanism according to claim 1, in which disposed within said box is a reversible endless screw that is adapted to turn inside said rack connector rod, with said endless screw being mounted on a shaft; in a normal position, said endless screw is adapted to be braked by a shoe that cooperates with a second lever that is mounted on said shaft and is held in a braking position via a spring.

3. A memory mechanism according to claim 2, in which said motor device is an electric motor that controls rotation of said endless screw, with signals being fed to said electric motor via a third lever of said single device to which are connected said Bowden cable means.

4. A memory mechanism according to claim 2, in which said reversible screw is driven by said motor device, which is controlled by an electronic card provided with a memory, said card being coupled to said single control device, permitting said seat to be moved from back to front and vice versa.

5. A memory mechanism according to claim 2, in which said seat further includes a backrest that is connected to said base plate and said arms via a common hinge pin, thereby permitting said seat to be brought into a position very close to a steering wheel when said seat moves forward to leave enough space to let passengers get to or out of rear seats of said vehicle.

6. A memory mechanism according to claim 1, in which said arms are joined at a lower part thereof to motor driven joint braces on said spindle; and in which in a central zone of said median longitudinal axis of said base plate of said seat, there is provided a corner plate, on a lower part of which is disposed a further spindle that moves inside a curved window formed in a heart-shaped part mounted on a support that is integral with said framing means of said vehicle floor, thereby permitting said seat to be brought from a normal position to a position that is tilted all the way to the front to leave enough space to enable rear seat passengers to get in and out of said vehicle; said mechanical bolt is in the form of a pivoting bolt that limits, in an upper part of said curved window, longitudinal displacement of said seat, without any unintended pivoting of said further spindle in a lower part of said curved window; full control of said seat is realized for total pivoting via said single device, as a control button, that via said Bowden cable means controls said first lever of said memory, and hence the base plate position and pivoted position of said seat for disengagement; via second Bowden cable means connecting said first lever and said pivoting bolt, said control button is adapted to free said pivoting bolt, with adjustment of a stable position of said base plate of said seat being effected by third Bowden cable means that run from a control lever to said joint braces to provide rotation of the same via a motor device.

7. A memory mechanism according to claim 6, in which said vehicle floor supports, below a front zone of said seat, said framing means which is provided in an upper part thereof with said corner plate, which supports a spindle that is adapted to move in branches of said window, which is formed in a flange that is integral with a bottom portion of said base plate of said seat; a bottom portion of said window, which is V-shaped, with one of its branches being curved and the other being rectilinear, is normally occupied by a mobile bolt that is controlled by fourth Bowden cable means connected to said control button.

8. A memory mechanism according to claim 2, in which said endless screw is controlled manually.

9. A memory mechanism according to claim 2, in which said endless screw is controlled via motor means.

* * * * *